Sept. 19, 1967  J. M. DAVIDSON  3,342,082
CONTROL KNOB FOR WASHING MACHINES AND OTHER DOMESTIC APPLIANCES
Filed Sept. 27, 1965

INVENTOR
JACK MILLER DAVIDSON
By Frederick M. Ritchie
HIS ATTORNEY

United States Patent Office 3,342,082
Patented Sept. 19, 1967

3,342,082
CONTROL KNOB FOR WASHING MACHINES
AND OTHER DOMESTIC APPLIANCES
Jack Miller Davidson, Mordialloc, Victoria, Australia,
assignor to General Motors Corporation, Detroit, Mich.,
a corporation of Delaware
Filed Sept. 27, 1965, Ser. No. 490,584
Claims priority, application Australia, Oct. 6, 1964,
50,059/64
2 Claims. (Cl. 74—553)

ABSTRACT OF THE DISCLOSURE

In preferred form a control knob having a serrated recess, chamfered supporting disc insertable into said recess and complementarily serrated to grip the serrations in the recess and a resilient split polygonal clip to hold the disc and knob together.

---

This invention relates to control knobs for washing machines and other appliances fitted with a control shaft adapted for rotational and/or axial movement immediately before or during the operation of the machine or appliance.

In some cases it is particularly desirable to prevent operational rotation of the control knob other than in the desired rotational direction of the mechanism associated with the control shaft in order to prevent damage to such mechanism. Another requirement of such control knobs is that of accurate alignment of an indicator on the knob with indicia on an adjacent panel or vice versa.

Hitherto, the means employed for mounting such control knobs on their associated shaft have usually permitted sufficient angular misalignment between the knob and its shaft to result in undesirable disorientation of the indicator with respect to the indicia. Costly precision methods of manufacture have hitherto been considered necessary to overcome such problems.

The primary object of the present invention is to provide an improved control knob of the kind indicated which avoids the foregoing objections by preventing manual rotation of the mechanism associated with the knob in the undesired direction whilst in addition extremely accurate alignment between the indicator and its associated indicia is obtained when the knob is fitted to its control shaft.

The improved knob has a minimum number of separate parts which are of relatively simple and inexpensive construction and capable of being readily assembled and disassembled when required.

In accordance with the present invention the improved control knob for washing machines and other appliances of the kind indicated comprises a supporting member of circular shape in plan, a finger grip and releasable retaining means for detachably connecting said supporting member and finger grip together after they have been selectively assembled in the desired relationship, said finger grip having an axial recess adapted to accommodate said supporting member, both the side wall of said recess and the side face of the supporting member having a series of complementary and circumferentially spaced serrations adapted to be brought into mating engagement by relative axial movement towards each other between said supporting member and finger grip.

Referring to the accompanying drawings.

Figure 1:
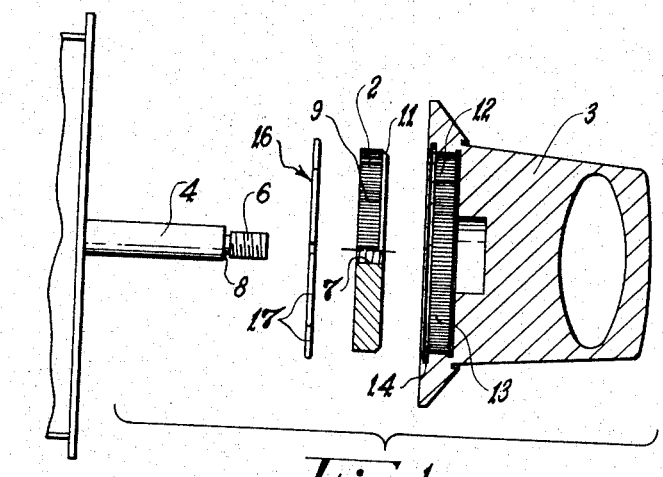
FIG. 1 is an exploded part sectional elevation showing the components of a control knob in accordance with one embodiment of the present invention.
Figure 2:
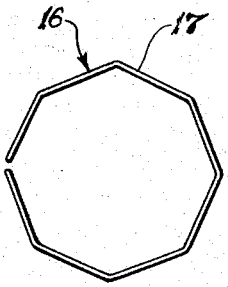
FIG. 2 is a front elevation of a displaceable retaining member seen in FIG. 1.
Figure 3:
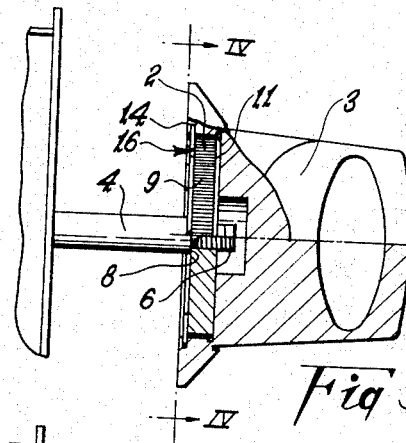
FIG. 3 is a part sectional elevation showing the components assembled upon their associated control shaft.

In accordance with the present inventiton, the improved knob includes a supporting disc 2, a finger grip 3 and releasable retaining means for detachably connecting these parts together after they have been adjustably assembled in the desired relationship.

The control shaft 4 to which the improved knob is fitted has an outer end portion of reduced diameter which is threaded externally as at 6 so as to engage an internally threaded hole 7 in the center of the supporting disc. The shaft is thus provided with a shoulder 8 at the inner end of its threaded portion for engagement by the supporting disc when in use.

The peripheral edge portion of the supporting disc is provided with a series of circumferentially spaced serrations 9 extending substantially parallel to the axis of the disc, the pitch of the serrations being predetermined according to the accuracy of the indicator alignment that is required.

The serrated peripheral edge portion of the disc is preferably provided on its inner edge with a radiused chamfer 11 for a purpose hereinafter mentioned. Alternatively this inner edge of the disc may be inclined inwardly.

The aforesaid finger grip 3 may be of any suitable formation but is provided at the rear with a substantially circular recess 12 of complementary diameter to that of the supporting disc. The depth of this recess is preferably slightly greater than the thickness of the disc and the circumferential wall of the recess is serrated as at 13 in such a manner as to complement the serrated edge portion of the supporting disc.

The releasable retaining means preferably includes a circumferential groove 14 provided in the circular wall of the recess adjacent to the outer edge thereof. This groove is adapted to removably accommodate a displaceable retaining member which preferably consists of a resilient split polygonal clip or the like member 16 formed of spring wire of suitable gauge so as to readily fit within the circumferential groove.

The length and free shape of the wire clip is such that it requires to be compressed in order to enter its groove in which it is maintained under compression when so assembled with the straight portions 17 of the clip forming chords with the circular wall of the recess in the finger grip.

In use, the supporting disc 2 is screwed on to its control shaft 4 until it engages the shoulder 8 with the chamfered inner edge 11 of the disc facing away from the adjacent end portion of the shaft.

Figure 4:
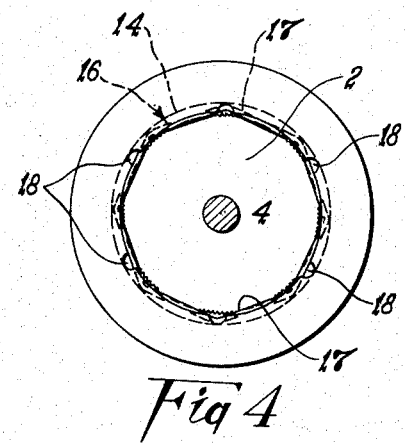
FIG. 4 is a cross section taken on the lines IV–IV of FIG. 3.

The resilient clip 16 is inserted into its groove 14 in the finger grip in which position the straight portions 17 of the clip overlie the entrance to the recess as seen more clearly in FIG. 4. With the associated control shaft set in the desired position the finger grip 3 and its spring retaining member are readily pushed onto the supporting disc in such a manner that the aforesaid indicator is correctly aligned with its indicia.

The chamfered inner edge 11 of the supporting disc facilitates its engagement with the finger grip by deflecting the straight portions 17 of the wire clip sufficiently to allow the supporting disc to pass therethrough whereupon the clip returns to its original form in which it overlies the rear surface of the supporting disc and opposes its disengagement from the finger grip.

In order to facilitate disengagement of these parts when so desired, one or more radial notches 18 may be formed in the rear of the finger grip around the recess 14 therein so as to permit a spike or other tool to be inserted behind the retaining member and readily dislodge it from its groove.

It will be appreciated from the foregoing that rotation of the knob in the correct direction for operation of the associated mechanism will cause the control shaft 4 to rotate in that direction. However undesirable rotation of the knob in the opposite direction simply causes it to unscrew from the shaft without causing the latter to rotate. Furthermore, the retention of the finger grip 3 to its supporting disc 2 by the retaining member 16 effectively prevents undesirable disengagement and enables the knob to be pushed and pulled when so desired for effecting axial movement of the control shaft.

Figure 5:
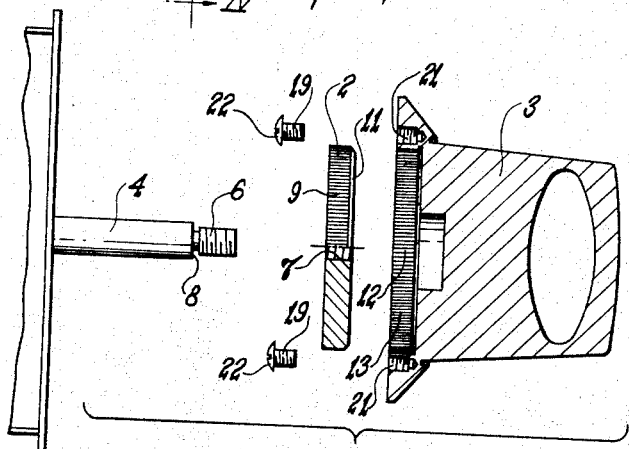
FIG. 5 is an exploded part sectional elevation showing the components of a control knob in accordance with a modification.
Figure 6:
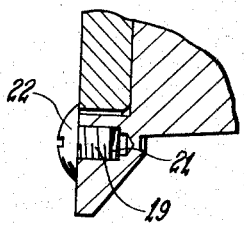
FIG. 6 is a sectional detail on an enlarged scale showing an associated supporting member and finger grip secured together in their operative position.

In accordance with a modification as illustrated in FIGS. 5 and 6 of the drawings, the retaining means consists of one or more screws 19 instead of the aforesaid split ring. In this case each of the screws is accommodated in a tapped hole 21 in the marginal edge portion of the finger grip 3 adjacent to the side wall of the recess 12 and substantially parallel with the axis of the finger grip, each screw being provided with a head portion 22 adapted to overlap the marginal edge of the disc 2 when the latter is operatively assembled in the finger grip.

When assembling the components of the modified form of the invention, the disc 2 is preferably first assembled on the threaded shaft 6 whereupon the finger grip 3 is positioned on the disc in the desired operative relationship. The assembled disc and finger grip are then necessarily unscrewed from the shaft before the retaining screws 19 are secured in position prior to the assembly being screwed back onto the shaft and brought into engagement with the shoulder 8 thereon.

It will also be apparent that the improved control knob may be quickly and easily assembled with extreme accuracy and also readily disassembled when so desired.

Various alterations, modifications and/or additions may be introduced into the foregoing without departing from the ambit of the invention as defined by the appended claims.

Having now described my invention, what I claim as new and desire to secure by Letters Patent is:

1. A control knob for washing machines and other appliances of the kind indicated comprising a supporting member of circular shape in plan, a finger grip and releasable retaining means for detachably connecting said supporting member and finger grip together after they have been selectively assembled in the desired relationship, said finger grip having an axial recess adapted to accommodate said supporting member, both the side wall of said recess and the side face of the supporting member having a series of preformed, complementary and circumferentially spaced serrations adapted to be brought into mating engagement by relative axial movement towards each other between said supporting member and finger grip, said supporting member being in the form of a disc having an internally threaded axial hole with said serrations formed in the peripheral edge portion of the disc so as to extend substantially parallel to the axis thereof, said recess in the finger grip being of substantially complementary formation, said recess in the finger grip being of slightly greater depth than the thickness of said disc, a circumferential groove being formed in the circular wall of said recess adjacent to the outer edge thereof and substantially utilizing all of that portion of the depth of said recess not filled by the thickness of said disc, said retaining means consisting of a resilient split polygonal ring adapted to be removably accommodated within said groove in such a manner that when assembled the straight portions of said ring form chords with the circular wall of said recess, said serrated peripheral edge portion of said disc being provided on its inner edge with an endless chamfer adapted to cooperate with the straight portions of said ring so as to facilitate its passage through said split retaining ring for subsequent engagement with the serrated recess in said finger grip.

2. A device according to claim 1 wherein one or more radial notches are formed in said finger grip in such a manner that each notch has an open mouth merging with the edge of the wall defining said circumferential groove so as to enable a tool to be inserted behind said supporting member and dislodge it from its groove when so desired.

References Cited

UNITED STATES PATENTS

| | | | |
|---|---|---|---|
| 1,444,212 | 2/1923 | Seiss | 74—553 |
| 1,882,625 | 10/1932 | Jacobi | 292—353 |
| 2,628,588 | 2/1953 | Mehler | 74—553 |
| 2,803,032 | 8/1957 | Barnsley | 287—53 X |
| 2,951,358 | 9/1960 | Miller | 74—553 |

FOREIGN PATENTS 1,036,971  8/1958  Germany.

FRED C. MATTERN, JR., *Primary Examiner.*